UNITED STATES PATENT OFFICE.

RAYMOND VIDAL, OF ASNIÈRES, FRANCE.

METHOD FOR PREPARING DIRECT-DYEING BLACK COLORING MATERIALS.

1,265,837. Specification of Letters Patent. Patented May 14, 1918.

No Drawing. Application filed August 18, 1916. Serial No. 115,576.

*To all whom it may concern:*

Be it known that I, RAYMOND VIDAL, chemist, a citizen of the Republic of France, and resident of 10 Rue de la Comète, Asnières, Seine, Republic of France, have invented an Improved Method for Preparing Direct-Dyeing Black Coloring Materials, of which the following is a specification.

This invention refers to the preparation of direct-dyeing black coloring materials and it consists in heating paramidophenol or the corresponding amidocresols in a medium formed by organic compounds such as phenols, cresols, xylenols, anilin, toluidins, xylidins, in order to provoke the reaction of the sulfur on the paramidophenol or corresponding amidocresols.

Example: 11 kilograms of paramidophenol mixed with 6 kgs. 600 grams of sulfur and with 5 kgs. 500 grams of the commercial mixture of the three cresols are heated to the boiling point in an apparatus provided with a device for allowing the vapors produced to flow back into the apparatus when condensed. The ebullition is maintained from 5 to 6 hours and even longer if necessary, until the escape of hydrogen sulfid slackens.

If there is any excess of organic compound, it is then collected either by simple distillation or by distillation in the vacuum, and the reaction mass is taken out of the apparatus in a pasty state. Said reaction mass becomes solid after cooling and it may be crushed or ground. In this state it constitutes a black powder which is insoluble in water.

In the foregoing example the paramidophenol can be replaced by one of the corresponding amidocresols or a mixture of said amidocresols, and instead of the mixture of the three cresols I may use one of the above named organic compounds, and I desire it to be understood that the appended claims are to be interpreted as including the equivalents stated.

The proportions of said organic compounds and those of the sulfur can be increased until their weight equals that of the amidophenol or of the cresol brought into reaction. On the other hand, the proportions of the sulfur can be lowered and reduced to about 40% of the weight of the amidophenol employed.

The coloring materials obtained by the above described process are soluble in alkaline sulfids and in the alkalis to which there has been added an alkaline hydrosulfite.

In this state they are employed for dyeing purposes and for the printing on vegetable fibers which they dye in black shades.

These shades differ from those obtained by means of the known sulfur coloring materials in that they do not turn to copper color and their resistance to chlorin and acids is increased and in that, owing to the absence of an excess of sulfur, they are very pure.

These characteristics are especially distinct from those of the blacks obtained by the direct fusion of the paramidophenol or of the corresponding amidocresols with sulfur alone.

Having now described the nature of my invention and in what manner the same is to be performed, I declare that what I claim is:

1. The herein described process for the production of direct-dyeing black coloring materials, which consists in boiling paramidophenol with sulfur and cresol until the evolution of hydrogen sulfid slackens, while returning the condensed vapors to the boiling mixture.

2. The herein described process which consists in boiling paramidophenol with sulfur and cresol until the evolution of hydrogen sulfid slackens.

3. The herein described coloring material produced from paramidophenol, sulfur, and cresol, said material dyeing and printing fabrics in fast black shades which do not turn copper color and are highly resistant to chlorin and to acids, insoluble in water, but soluble in alkaline sulfids and in alkalis to which an alkaline hydrosulfite has been added.

RAYMOND VIDAL.

Witnesses:
SENTIZON ROBEY,
G. JUNNULLE.